United States Patent
Prasanna et al.

(10) Patent No.: US 11,861,345 B2
(45) Date of Patent: Jan. 2, 2024

(54) UPDATING GRAMMAR FILE TO CONFIGURE DEPLOYMENT OF UPDATES OF NETWORK DEVICES

(71) Applicant: HEWLETT PACKARD ENTERPRISE DEVELOPMENT LP, Houston, TX (US)

(72) Inventors: Padiyar Guru Prasanna, Roseville, CA (US); Vivek Gunasekaran, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 132 days.

(21) Appl. No.: 17/200,684

(22) Filed: Mar. 12, 2021

(65) Prior Publication Data

US 2022/0291914 A1 Sep. 15, 2022

(51) Int. Cl.
  *G06F 8/65* (2018.01)
  *G06F 40/14* (2020.01)
  *G06F 40/253* (2020.01)
  *G06F 40/211* (2020.01)

(52) U.S. Cl.
  CPC ............... *G06F 8/65* (2013.01); *G06F 40/14* (2020.01); *G06F 40/211* (2020.01); *G06F 40/253* (2020.01)

(58) Field of Classification Search
  CPC ........ G06F 8/65; G06F 40/253; G06F 40/211; G06F 40/14
  USPC .......................................... 717/124, 168–128
  See application file for complete search history.

(56) References Cited

U.S. PATENT DOCUMENTS

| | | | |
|---|---|---|---|
| 7,792,930 B1 | 9/2010 | Zhang et al. | |
| 9,213,781 B1* | 12/2015 | Winter | G06K 9/6215 |
| 9,942,095 B2 | 4/2018 | Aybay et al. | |
| 10,177,977 B1 | 1/2019 | Avramov et al. | |
| 2002/0015093 A1* | 2/2002 | Dureau | H04N 21/443 348/E5.005 |
| 2016/0112252 A1 | 4/2016 | Notari | |
| 2017/0206064 A1* | 7/2017 | Breazeal | G06F 8/34 |
| 2020/0184009 A1* | 6/2020 | Wood | H04L 67/10 |

OTHER PUBLICATIONS

ARUBA, "ARUBA NETEDIT Coordinated network switch configuration, monitoring and troubleshooting", Data Sheet, 2019, 4 pages.
DNSStuff, "11 Best Network Configuration Management Tools," Nov. 4, 2020, 18 pgs., website accessed Nov. 23, 2020, https://www.dnsstuff.com/network-configuration-management-tools, SolarWinds Worldwide, LLC.

* cited by examiner

*Primary Examiner* — Chuck O Kendall
(74) *Attorney, Agent, or Firm* — Mauriel Kapouytian; Woods LLP

(57) ABSTRACT

Systems and methods are provided for extracting grammar data from a network device, the grammar data being used to validate syntax of commands provided to the network device, determining that the server lacks an existing grammar file corresponding to the network device, and generating a new grammar file including a base grammar file and secondary grammar files based on the extracted grammar data.

20 Claims, 14 Drawing Sheets

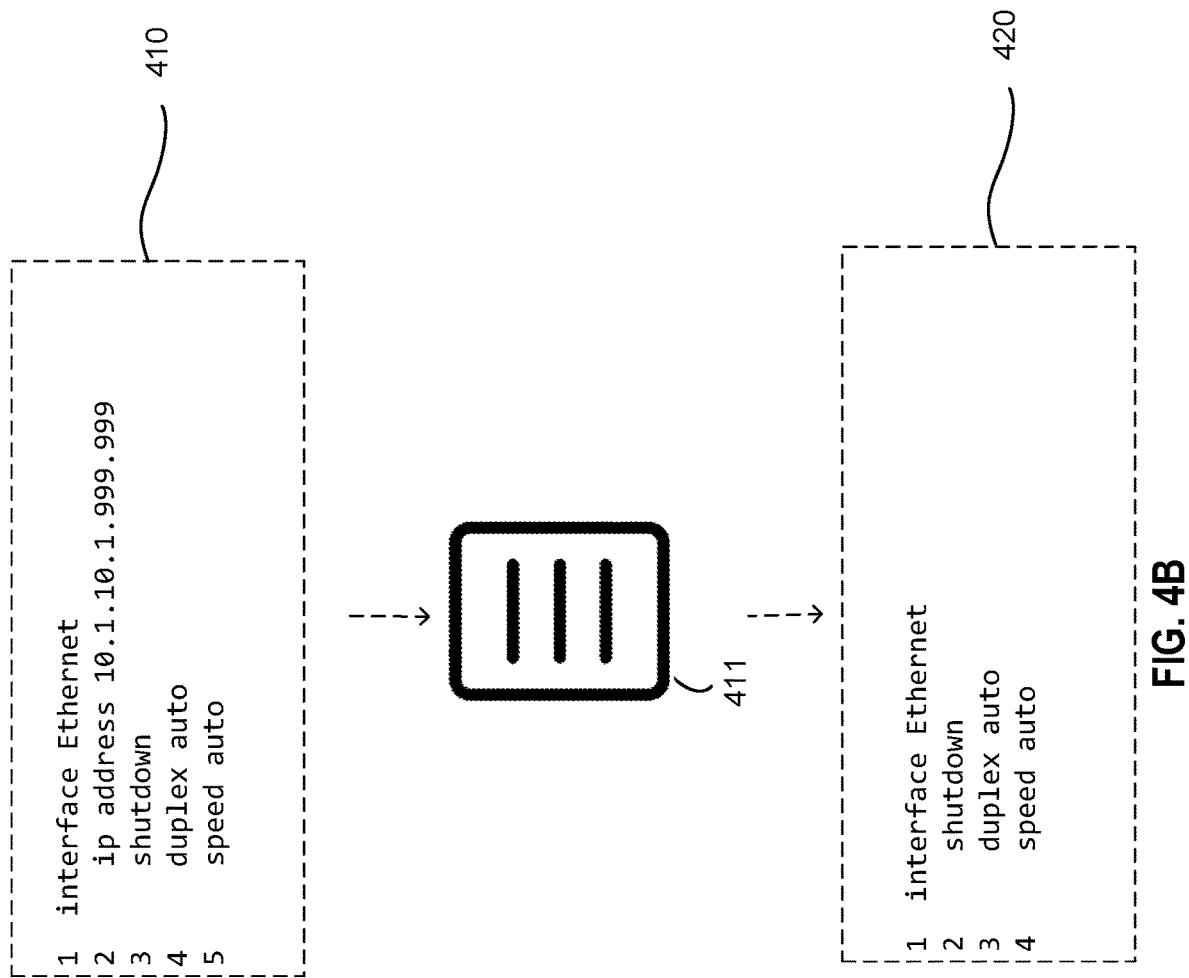

UPDATING GRAMMAR FILE TO CONFIGURE DEPLOYMENT OF UPDATES OF NETWORK DEVICES

BACKGROUND

A grammar file is used by a network device, such as a switch, to validate syntaxes of commands at the network device. When a network device updates its firmware and/or software in order support additional settings, functions, and/or commands, the grammar file of the network device may also be updated accordingly at the network device to incorporate the new settings, functions, and/or commands enabled by the firmware or software updates. As an illustrative example, an additional function that may require an update of firmware and/or software of a network device may include MAC (media access control) address filtering, which provides a list of wireless network clients that are permitted or denied access to a network. A server may control operations of the network device, including receiving, interpreting, and implementing commands. In order to enable deployment of the firmware and/or software updates, the server may also need to obtain the updated grammar file.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4B is an exemplary illustration of an implementation of a patch, according to embodiments described in the present disclosure.

Figure 1A:
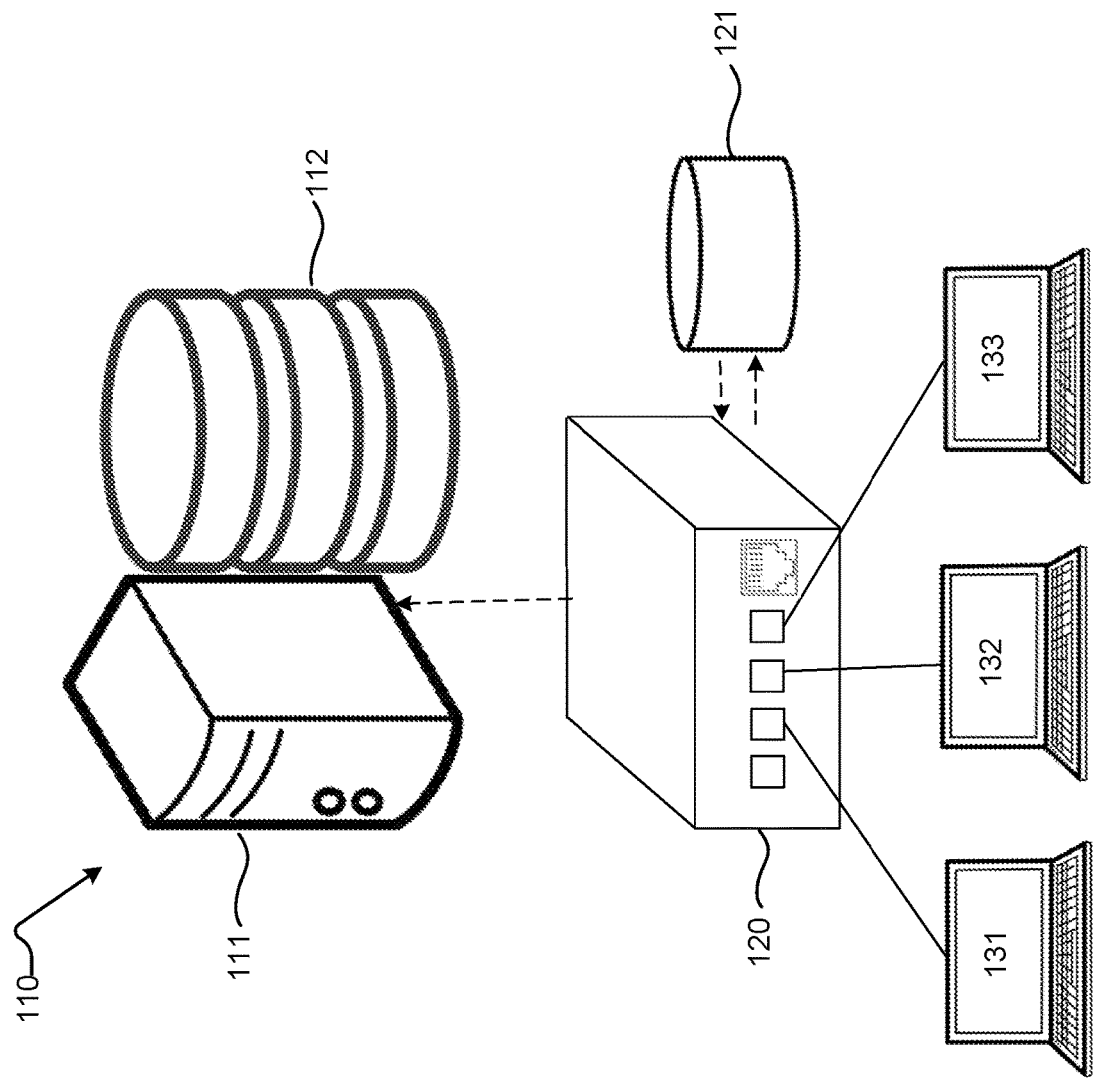
FIG. 1A is an exemplary illustration of a computing system that generates a new grammar file in accordance with grammar data at a network device, according to embodiments described in the present disclosure.

The figures are not exhaustive and do not limit the present disclosure to the precise form disclosed.

DETAILED DESCRIPTION

In order to facilitate a wide range of options of network configurations, network devices such as switches need to be configured to rapidly deploy updates or changes to network configurations. Such updates or changes include firmware or software updates to an existing network device, or rolling back previous updates or changes. Some examples of network configurations include command line interface (CLI), layer 2 (L2), and layer 3 (L3) configurations. One particular example of a configuration change may include increasing a range of options to suspend network access to certain client devices that are exceeding a threshold amount of data traffic, or increasing security requirements for certain client devices to obtain network access. A grammar file of the network devices may include commands available in a network configuration and thus encapsulate the features and/or capabilities of a network configuration. When a network configuration is updated or changed, the changes are reflected in the grammar file.

A server may control operations of the network devices, including receiving, interpreting, and implementing commands. In order to enable full deployment of the firmware and/or software updates, the server may also need to recognize the changes or updates to an existing network device, as reflected in the updated grammar file. Thus, to carry out the configuration changes, the server may need to obtain the updated grammar file. If the server does not have the updated grammar file, the added features of the firmware and/or software updates may not be interpreted by the server and may not be accessed.

A current problem is that the process of updating a grammar file at the server is done manually. A human operator manually inputs the updated grammar file at the server. Currently, the process may be tedious and require days. Not only does this requirement of manually updating consume human resources, but it also delays configuration changes to a network. This problem may be especially pressing if a firmware update includes a security update to address a security loophole, and may result in compromising data security at a network.

Embodiments described herein address these technical problems by obviating the need to manually update a grammar file at a server, which may include a remote server such as a cloud server. Thus, the server may automatically obtain or generate a grammar file of a network device without requiring human input. The server may obtain or extract grammar of a network device and generate a grammar file, along with secondary or auxiliary grammar files, in conformance with the obtained grammar.

In some embodiments, as will be described with respect to the FIGS. below, the server may obtain grammar information from a network device such as a switch. The server may generate a grammar file in conformance with the grammar information along with secondary or auxiliary grammar files which may include a mask file and a patch file. The mask file may include metadata regarding ordering and interpreting contexts of commands to expedite processing. The patch file may include rules to address edge cases, such as, if a particular command is not to appear or to appear differently in a running configuration. The running configuration may include a historical log of all commands requested or executed during a particular session.

FIG. 1A is an exemplary illustration of a computing system 110 that generates or updates grammar files of network devices. The description below provides an overview of the process of generating or updating grammar files to network devices. Further details will be provided in subsequent FIGS. 1B, 2A-2B, 3A-3B, and 4A-4B. The computing system 110 may include a server. The server may be remote from a network site, such as a cloud server. The computing system 110 may include a computing component 111, which may be implemented as the aforementioned server, and a database 112.

The computing component 111 may receive, from a network device 120, information about a grammar used by the network device 120. The grammar may be used to validate syntaxes of commands entered at the network device 120, and/or suggest additional feasible commands. The network device 120 may include a storage 121 that stores parameters, configurations, and/or protocol of the network device 120, which may include a grammar of the network device 120. The storage 121 may be either internal to the network device 120 or external to the network device 120, as shown in FIG. 1A. The network device 120 may be connected to client devices such as client devices 131, 132, and 133. Although only three client devices are shown, any suitable number and/or type of client devices may be connected to the network device 120.

In some embodiments, the computing component 111 may be notified or informed of a firmware and/or software update at the network device 120. The firmware and/or software update at the network device 120 may result in the grammar of the network device 120 being updated accordingly. The computing component 111 may extract or obtain the information required to update or generate a base grammar file, and secondary or auxiliary grammar files from the storage 121 of the network device 120 using an API (Application Programming Interface) such as Representational State Transfer (REST). In particular, the computing component 111 may extract commands and/or protocols supported by the network device 120, parameters that may be inputted into the commands or otherwise used in a configuration of the network device 120, and particular syntactical rules of the commands and the parameters. For example, the computing component 111 may extract supported commands or protocols such as NTP (Network Time protocol), VSX (Virtual System Extension), or RADIUS (Remote Authentication Dial In User Service), tunneling protocols that connect separate networks, or foo commands, which define variable parameters or settings such as hostnames and port numbers. The computing component 111 may update or generate a base grammar file, and secondary or auxiliary grammar files, so that the computing component 111 may implement configuration or other changes as a result of the firmware and/or software update without requiring a manual update or input. In such a manner, the implementation of changes resulting from firmware and/or software changes at network devices may be greatly expedited and more efficient. In some embodiments, the base grammar file and the secondary or auxiliary grammar files may be generated in JSON (JavaScript Object Notation) format.

Figure 1B:
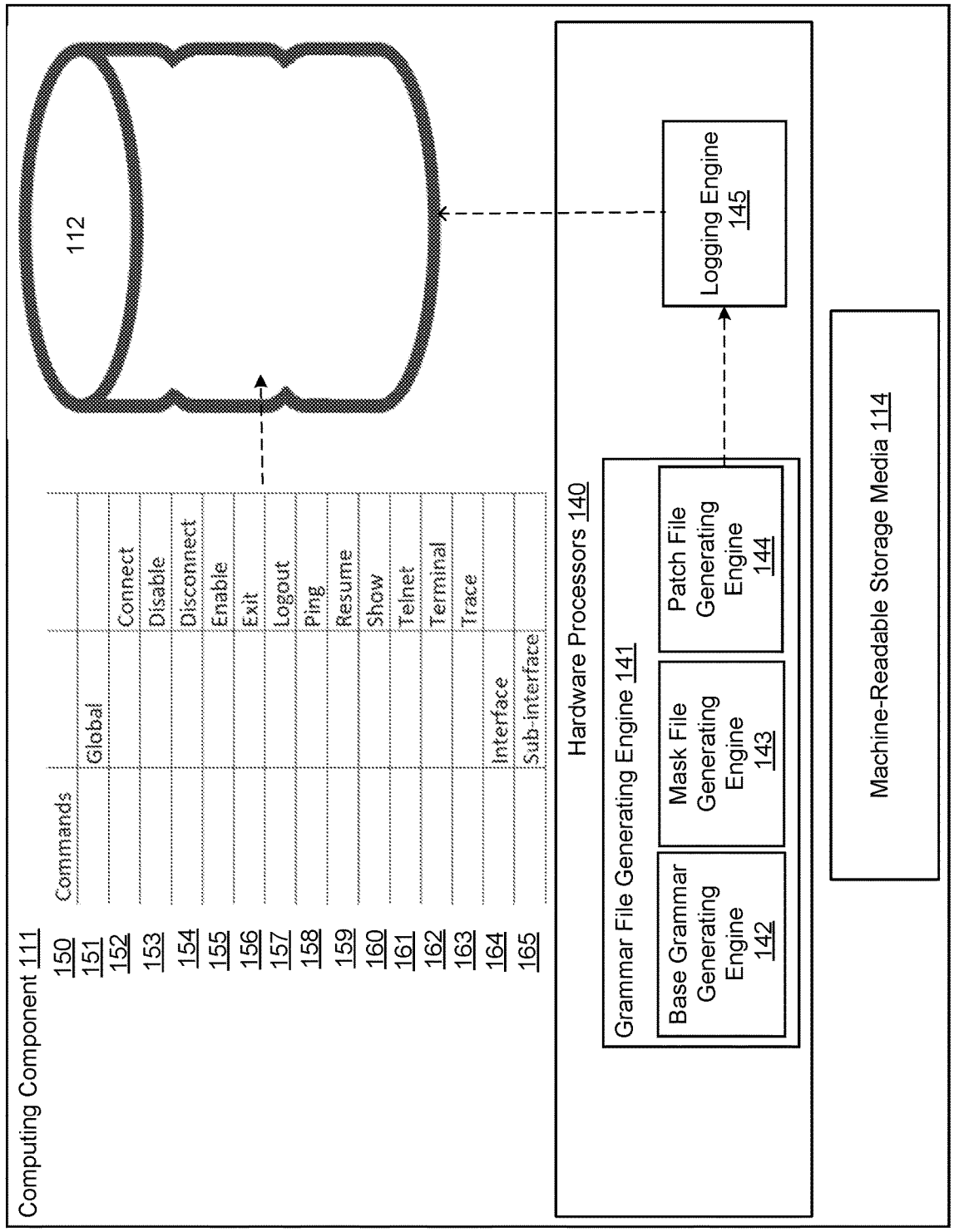
FIG. 1B is an exemplary illustration of a computing component within the computing system of FIG. 1A that generates separate components of a grammar file, according to embodiments described in the present disclosure.

As shown in FIG. 1B, the computing component 111 may include one or more hardware processors 140 and machine-readable storage media 114 storing a set of machine-readable/machine-executable instructions that, when executed, cause the hardware processor(s) 140 to generate, calibrate, and/or update one or more grammar files in accordance with grammar used by network devices such as the network device 120. The computing component 111 also includes a database 112 that may include a repository of existing grammar files mapped to existing network devices and/or a stored log (e.g., running configuration) of commands 150 inputted at and/or executed by the network devices. The computing component 111 may first identify or discover a connected network device such as the network device 120 using a protocol such as LLDP (Link Layer Discovery Protocol). The computing component 111 may determine whether an existing grammar file is mapped to, or corresponds to, a network device that is newly discovered or one that is updated. If the computing component 111 determines that no existing grammar file exists in the repository, the computing component 111 generates the grammar file corresponding to the new or updated network device. In some embodiments, the computing component 111 may only generate a grammar file if the network device is of a specified type or falls within a specific range of network devices. For example, the computing component 111 may only generate a grammar file if the network device has a particular operation system (OS). If the network device is not of a specific type or does not fall within a specific range of network devices, the computing component 111 may not generate a grammar file for that network device and thus only monitor that network device without configuring that network device.

The hardware processors 140 may include a grammar file generating engine 141 and a logging engine 145. The grammar file generating engine 141 may generate a grammar file based on grammar stored, for example, in the storage 121 of a network device such as the network device 120. The grammar file generating engine 141 may obtain separate components of the grammar file, which may include a base grammar, a mask, and a patch. The grammar file may be separated into different components or files in order to more effectively delegate processing tasks, which may enable the computing component 111, or a subcomponent of the computing component 111, to validate one particular aspect of grammar by searching or parsing through a particular file that is dedicated to that particular aspect. The base grammar may be generated by a base grammar generating engine 142. The mask may be generated by a mask file generating engine 143. The patch may be generated by a patch file generating engine 144. As will be shown in the subsequent FIGS. 2A-2B, 3A-3B, and 4A-4B, each of the components of the grammar file generated by the grammar file generating engine 141 may include a subset of grammar data obtained or extracted from a network device such as the network device 120. A subset of data is to be construed as all or a portion of the data. In particular, the base grammar generating engine 142, the mask file generating engine 143, and the patch file generating engine 144 may apply modifications to the grammar obtained or extracted from a network device, such as particular formatting modifications that transform the grammar to a JSON (JavaScript Object Notation)-Schema. As an illustrative example, the base grammar generating engine 142, the mask file generating engine 143, and the patch file generating engine 144 may include descriptions of the commands, protocols, and/or parameters in the grammar as nonexecutable text. The logging engine 145 may store a log, such as a running configuration, of commands inputted at and/or executed by network devices such as the network device 120. The patch may define how certain commands show up or are hidden in the log, which may be stored in the database 112.

Figure 2A:
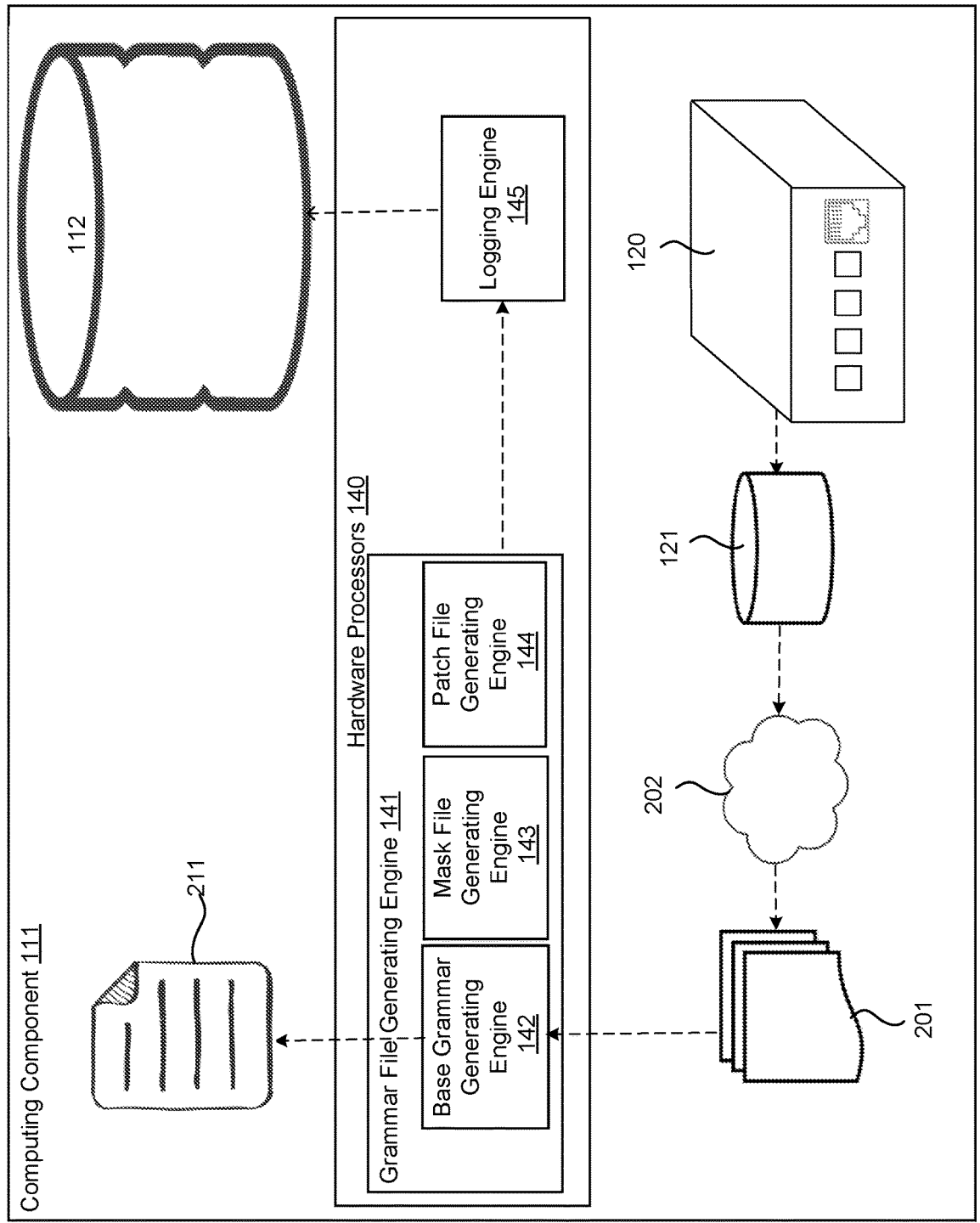
FIG. 2A is an exemplary illustration of a process of generating a base grammar file, a component of the grammar file, according to embodiments described in the present disclosure.

In FIG. 2A, the base grammar generating engine 142 may obtain grammar data 201 from the storage 121 of the network device 120 via an API such as a REST API 202. The grammar data 201 may be raw data stored in the storage 121 of the network device 120. The grammar data 201 may include commands and/or protocols supported by the network device 120, parameters that may be inputted into the commands and/or protocols, and particular syntactical rules of the commands and/or protocols and the parameters. As illustrative examples, supported commands or protocols may include NTP (Network Time protocol), VSX (Virtual System Extension), or RADIUS (Remote Authentication Dial In User Service), tunneling protocols that connect separate networks, or foo commands, which define variable parameters or settings such as hostnames and port numbers.

Figure 2B:
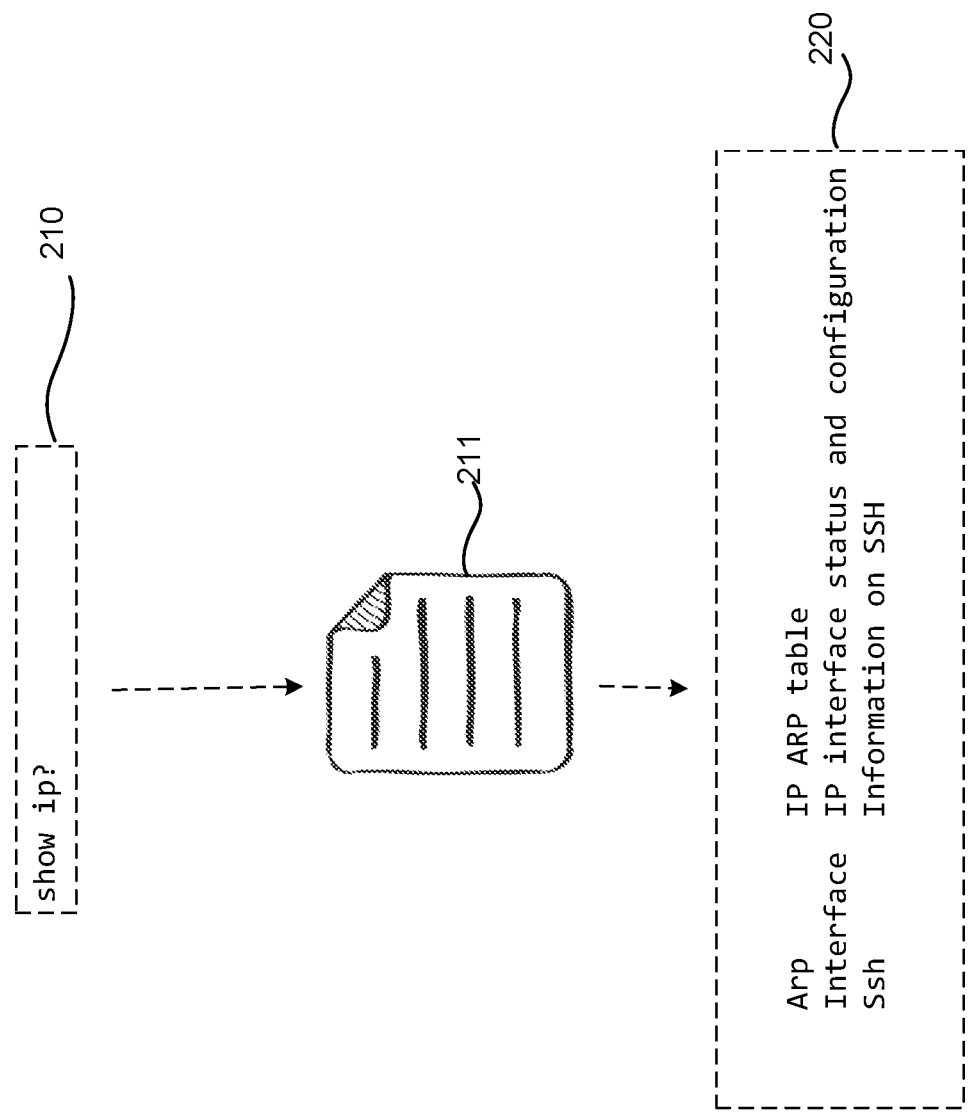
FIG. 2B is an exemplary illustration of an implementation of a base grammar file, according to embodiments described in the present disclosure.

The base grammar generating engine 142 may generate a base grammar file 211 by reformatting and/or applying syntactical changes to transform a subset of the grammar data 201 into a JSON-schema format. For example, the base grammar generating engine 142 may include descriptions of the commands, protocols, and/or parameters in the grammar data 201 as nonexecutable text. The descriptions may appear on a user interface and elucidate functions of the commands, protocols, and/or parameters. The generated base grammar file 211 may include a list of permitted commands specific to a software and/or firmware version of the network device 120. The computing component 111 may validate syntax of commands entered at the network device 120 by comparing the entered commands to the permitted commands in the generated base grammar file 211. The computing component 111 may perform syntax highlighting using the generated base grammar file 211 in order to identify particular syntactic errors or nonconformities. The computing component 111 may further use the generated base grammar file 211 to generate a list of keywords, commands, and/or parameters available if the computing component 111 receives a keyword as an entry. For example, as shown in FIG. 2B, if the computing component 111 receives an entry 210 of "show ip," the computing component 111 may, from the base grammar file 211, generate a list of further keywords, commands, and/or parameters that are valid command options to complete the entry 210. In the example shown in FIG. 2B, a list 220 of further keywords, commands, and/or parameters may include "Arp," "Interface," and "Ssh," so that complete valid commands may include "show ip Arp," "show ip Interface," or "show ip Ssh." The list 220 may further include a brief description of what each completed command entry does.

Figure 3A:
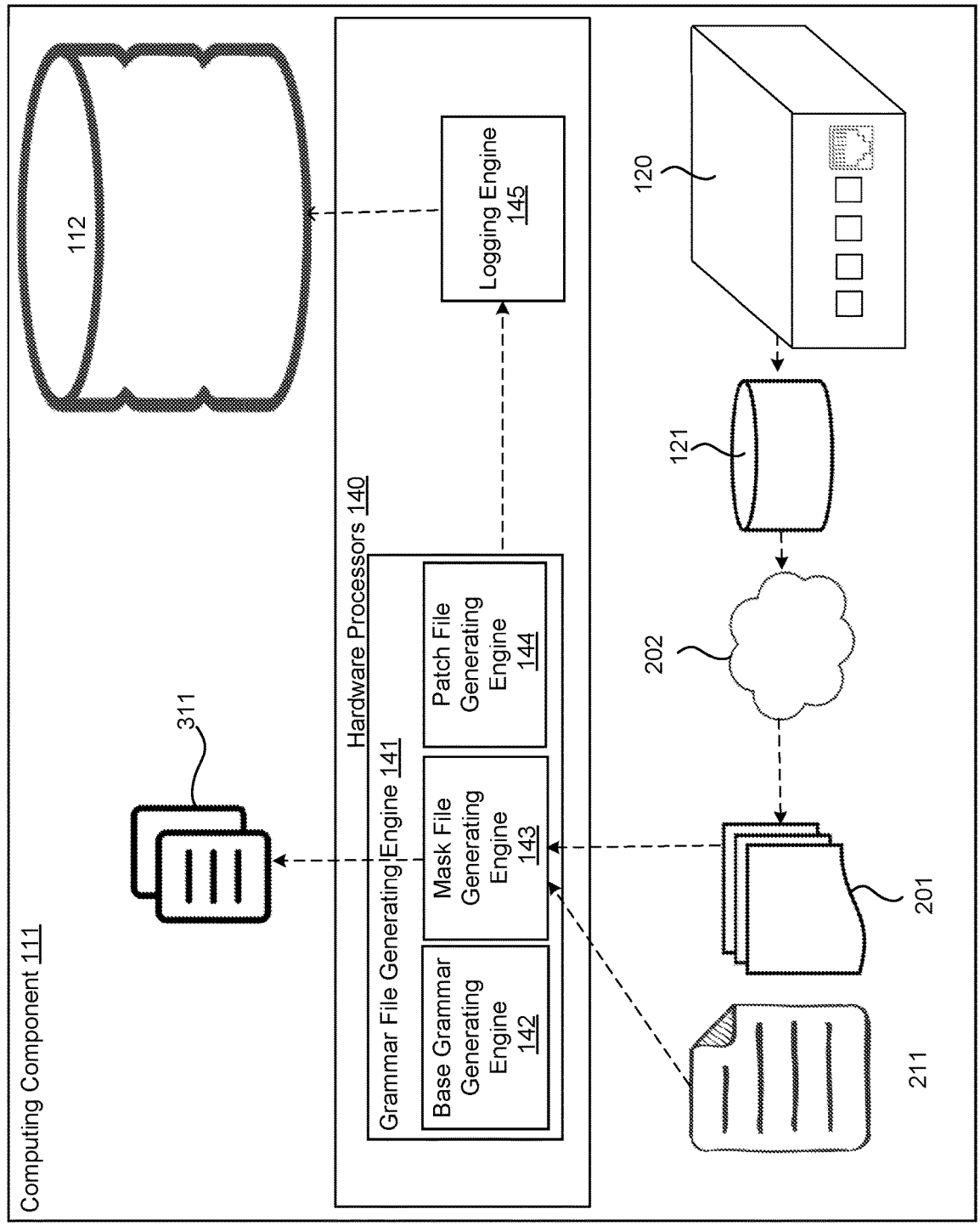
FIG. 3A is an exemplary illustration of a process of generating a mask, a component of the grammar file, according to embodiments described in the present disclosure.

In FIG. 3A, the mask file generating engine 143 may obtain grammar data 201 from the storage 121 of the network device 120 via an API such as the REST API 202. The mask file generating engine 143 may generate a mask 311 from a subset of the grammar data 201 and/or from a subset of the base grammar file 211. In some embodiments, the mask 311 may include a file. In some embodiments, the mask file generating engine 143 may parse the grammar data 201 and/or the base grammar file 211 simultaneously or in parallel with the generation of the mask 311. For example, the mask file generating engine 143 may identify a relevant portion of the grammar data 201 and/or the base grammar file 211 to be used to derive, obtain, or generate the mask 411. The mask file generating engine 143 may continue to parse the grammar data 201 and/or the base grammar file 211 while generating the mask 311, thus enabling the generation of the mask 311 without interruption in the parsing of the grammar data 201 and/or the base grammar file 211. Such parallel or simultaneous operations may be infeasible or impossible during a manual update of a grammar file, which would inevitably entail interruptions in parsing or generating operations. In particular, during a manual update to generate a mask, parsing of the grammar data 201 and/or the base grammar file 211 would be interrupted.

In some embodiments, the mask 311 may include data or metadata that is not present in the base grammar file 211. The mask 311 may include a condensed version of the base grammar file 211 and/or metadata regarding ordering and interpreting contexts of commands to expedite processing and ensure proper processing of commands. The metadata may include grammar rules to be used by the computing component 111 to recognize contexts of commands, entities, or objects. For example, using the mask 311, the computing component may recognize an entry containing "1/1/1/" or an equivalent format as being in an interface context. By recognition of the context of commands, the computing component 111 may sort and/or reorder commands to correct dependencies between commands and/or add missing declarations, while confining available options to be compatible within that context. In order to generate the mask 311, the computing component 111 may extract ordering data or metadata of CLI commands from existing network devices such as existing switches. The ordering data or metadata may include tokens, which identify permitted formats and/or contexts of repeatable commands (e.g., commands in a specific format and/or context that include one or more permitted variable components) that may be sorted based on comparators. For example, a token may define a series of numbers separated by backslashes, such as "1/1/1" or "1/1/2" as being in an interface context. As another example, a token may identify an entry beginning with "VRF" to belong to a VRF (virtual routing and forwarding) context, in which command options may include "VRF management," "VRF default" or "VRF test." Comparators may include rules by which to sort such commands. For example, a number comparator may sort commands in an ascending order. An alphabetic comparator may sort commands alphabetically. Thus, if a series of command entries received by the computing component 111 does not conform to a particular order as defined by the ordering data or metadata, the computing component 111 may resort the command entries.

Figure 3B:
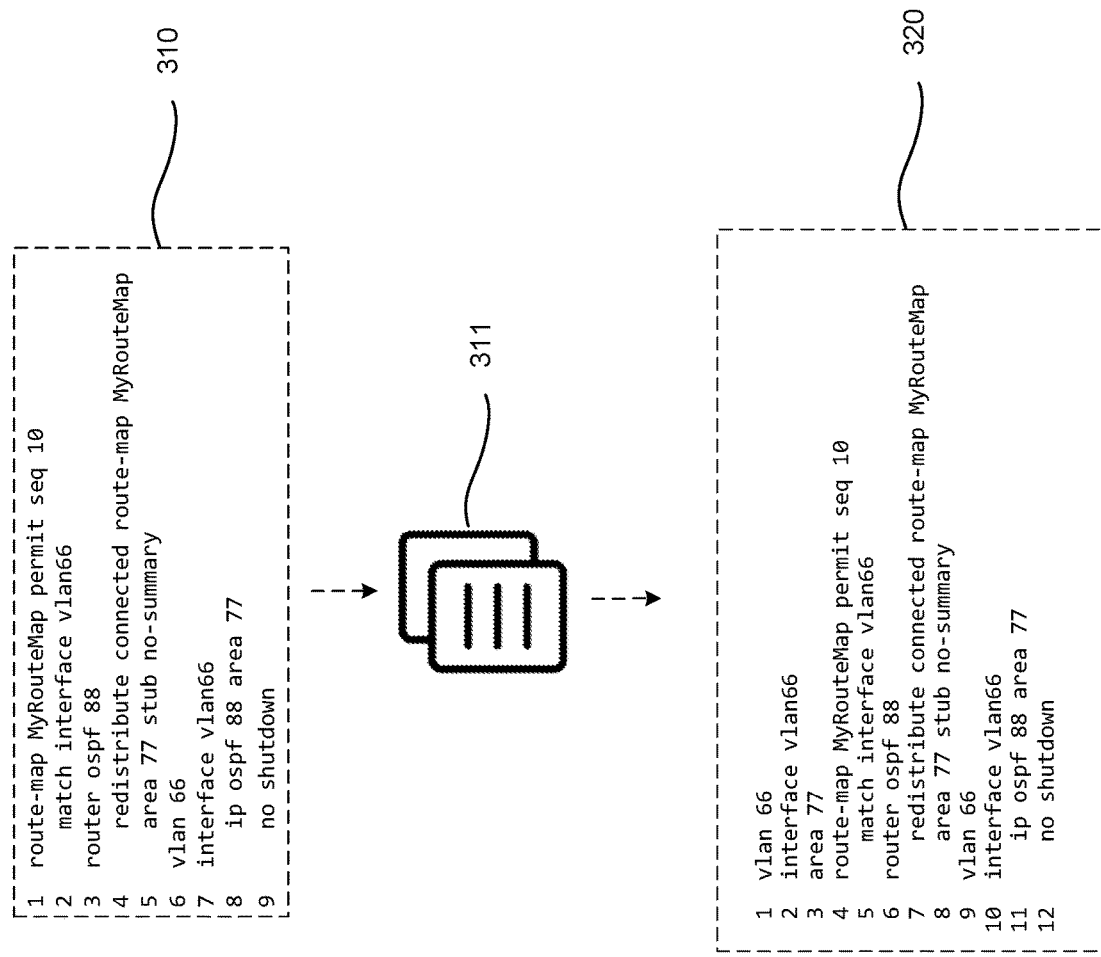
FIG. 3B is an exemplary illustration of an implementation of a mask, according to embodiments described in the present disclosure.

In the example shown in FIG. 3B, the computing component 111 may determine contexts of entities in a command script 310. In particular, the computing component 111 may determine that the entities "interface vlan66," "vlan 66," and "router ospf," were referenced in lines 2 and 5 of the command script 310, without being declared first. Here, the identifier "vlan66" has no space between "vlan" and "66" while the object "vlan 66" includes a space between "vlan" and "66" because the computing component 111 may remove the previously existing space between "vlan" and "66" to create a single identifier "vlan66." The computing component 111 may append declarations to the aforementioned entities in lines 1-3 of an updated command script 320 to ensure that the commands in the updated command script 320 will run without exceptions.

Figure 4A:
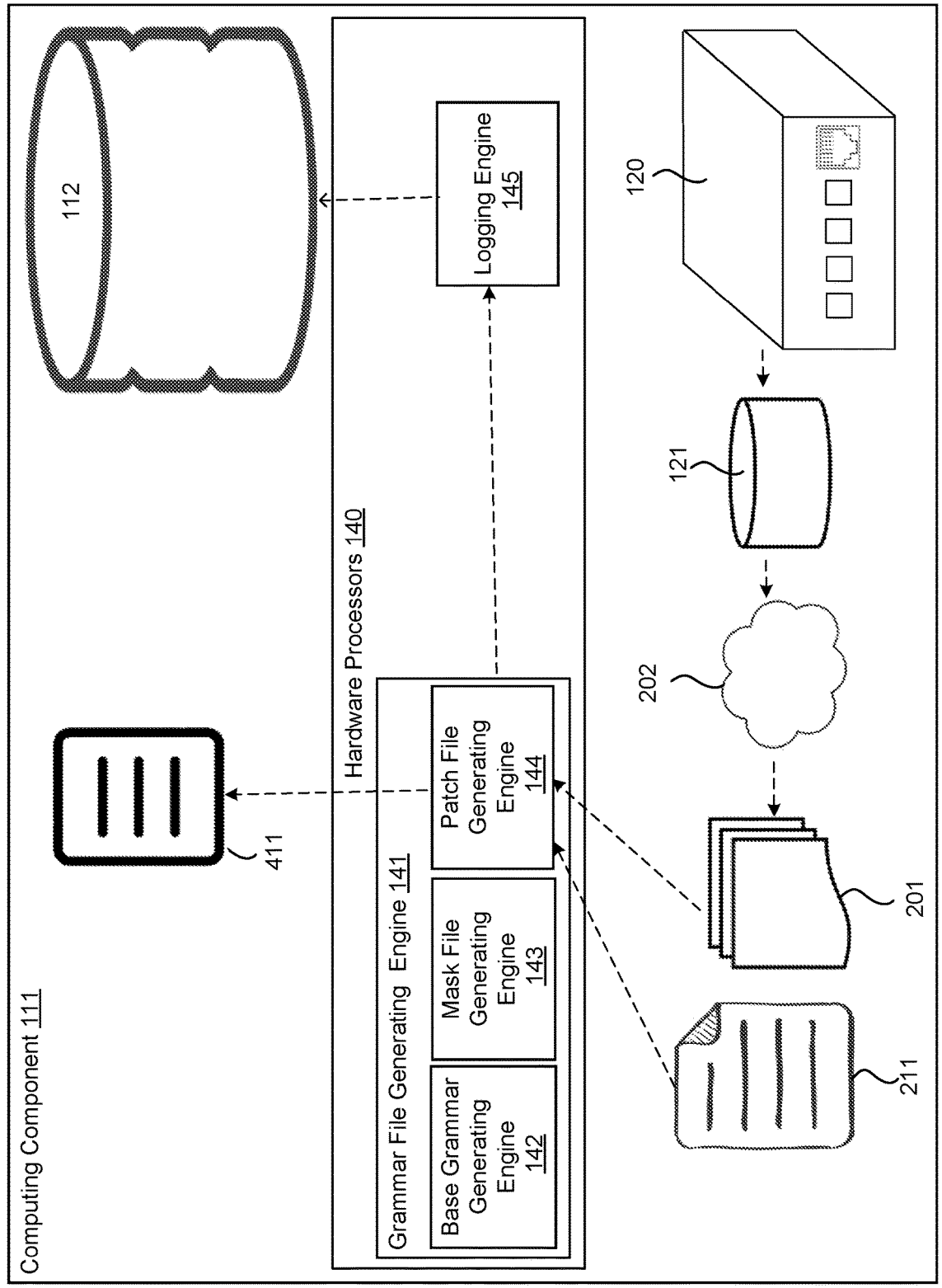
FIG. 4A is an exemplary illustration of a process of generating a patch, a component of the grammar file, according to embodiments described in the present disclosure.

In FIG. 4A, the patch file generating engine 144 may obtain grammar data 201 from the storage 121 of the network device 120 via an API such as the REST API 202. The patch file generating engine 144 may generate a patch 411 from a subset of the grammar data 201 and/or from a subset of the base grammar file 211. In some embodiments, the patch 411 may include a file. In some embodiments, the patch 411 may be generated simultaneously, or in parallel with, the generation of the mask 311. Thus, the simultaneous or parallel generation of the patch 411 and the mask 311 transcends the capabilities of a manual update of a grammar file. In some embodiments, the patch file generating engine 144 may parse the grammar data 201 and/or the base grammar file 211 simultaneously or in parallel with the generation of the patch 411. For example, the patch file generating engine 144 may identify a relevant portion of the grammar data 201 and/or the base grammar file 211 to be used to derive, obtain, or generate the patch 411. The patch file generating engine 144 may continue to parse the grammar data 201 and/or the base grammar file 211 while generating the patch 411, thus enabling the generation of the patch 411 without interruption in the parsing of the grammar data 201 and/or the base grammar file 211. Such parallel or simultaneous operations may be infeasible or impossible during a manual update of a grammar file, which would inevitably entail interruptions in parsing or generating operations. In particular, during a manual update to generate a patch, parsing of the grammar data 201 and/or the base grammar file 211 would be interrupted. The patch 411 may include data that is not present in the base grammar file 211 or in the mask 311. The patch 411 may include rules to address edge cases, such as, if a particular command is not to appear or to appear differently in a running configuration. The running configuration may include a historical log of all commands requested or executed during a particular session. As an illustrative example, in FIG. 4B, a running configuration 410 may originally display an ip address connected to an interface. However, the patch 411 may include rules that specify that an ip address is not to be shown in, or is to be redacted from, the running configuration. Thus, using the rules from the patch 411, the computing component 111 may update the running configuration 410 and generate an updated running configuration 420 that removes the ip address previously in line 2 of the running configuration 410.

Returning back to FIG. 1B, the logging engine 145 may log the commands 150 into the database 112 in accordance with the generated or updated grammar files. For example, the grammar files, such as the patch 411, may identify or define commands that are permitted at the network devices, contexts and ordering of the aforementioned commands, and/or other specific manners in which the commands should appear or not appear. In a particular implementation, the commands 150 may include global commands 151, interface commands 164, and/or sub-interface commands 165. The global commands 151 may include commands that affect or pertain to an entire network, which may include multiple network devices. The interface commands 164 may include commands that are specific to an operation of an interface. The sub-interface commands 165 may include commands that configure or modify a virtual interface created from an interface, such as a particular application running on a client device. Particular global commands 151 may include, without limitation, any of a connect command 152 that opens a terminal connection, a disable command 153 that turns off privileged commands, a disconnect command 154 that disconnects an existing network connection, an enable command 155 that turns on privileged commands which may include operating parameters, testing, and commands such as show, copy, and debug, an exit command 156 that exits from an execution mode, a logout command 157 which may be synonymous with the exit command 156, a ping command 158 that sends echo messages to network devices, a resume command 159 that resumes an active network connection, a show command 160 that shows running system information, a telnet command 161 that opens a telnet connection, a terminal command 162 that sets terminal line parameters, and/or a trace command 163 that traces a route to a destination. Same or analogous commands may also be implemented as part of the interface commands 164 and the sub-interface commands 165. In some embodiments, the database 112 may include a volatile or non-volatile storage. Thus, the stored log may be stored in the database 112 either temporarily or permanently.

Figure 5A:
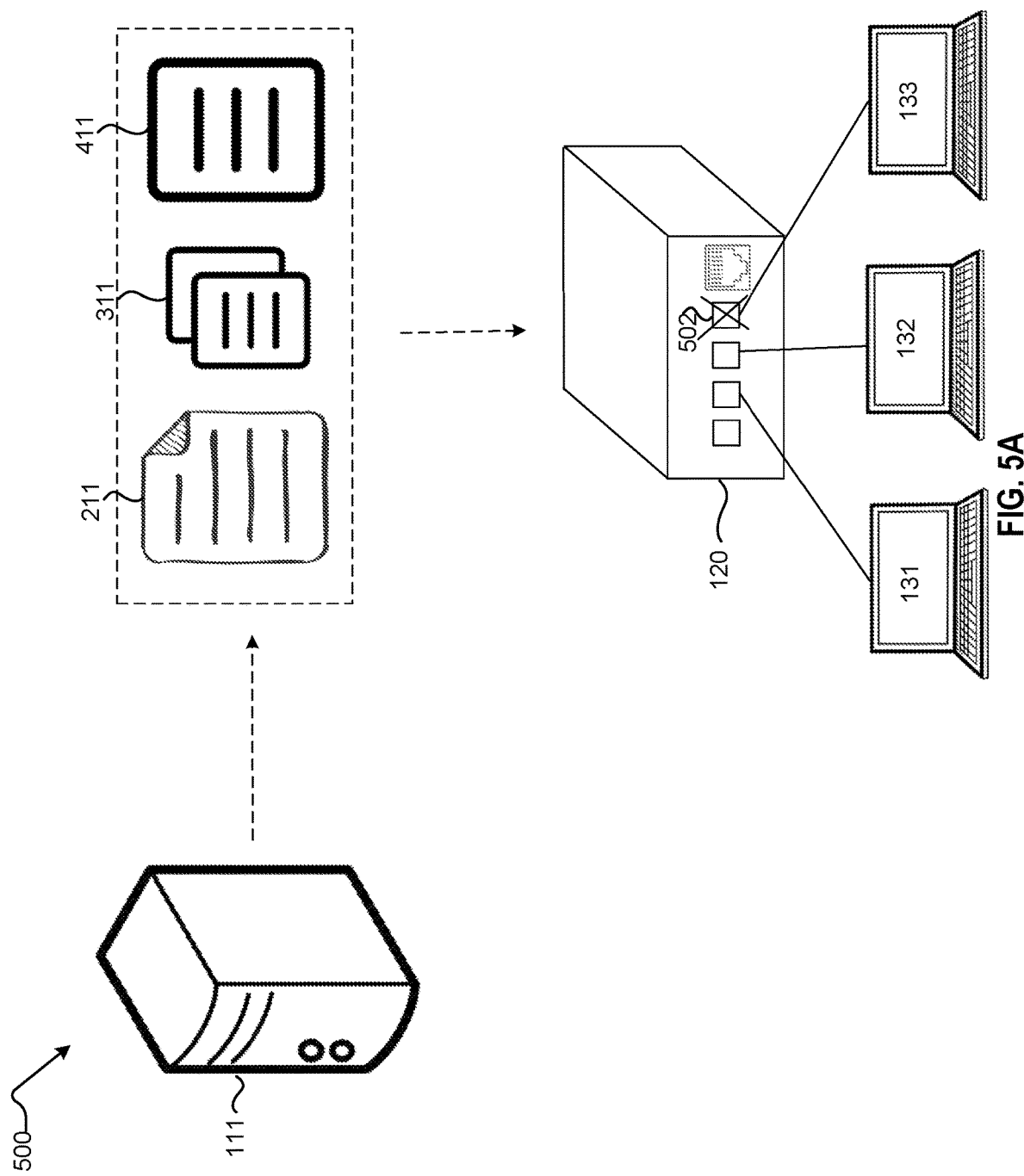
FIG. 5A is an exemplary illustration of an implementation of a configuration change using a commands validated by a grammar file, according to embodiments described in the present disclosure.
Figure 5B:
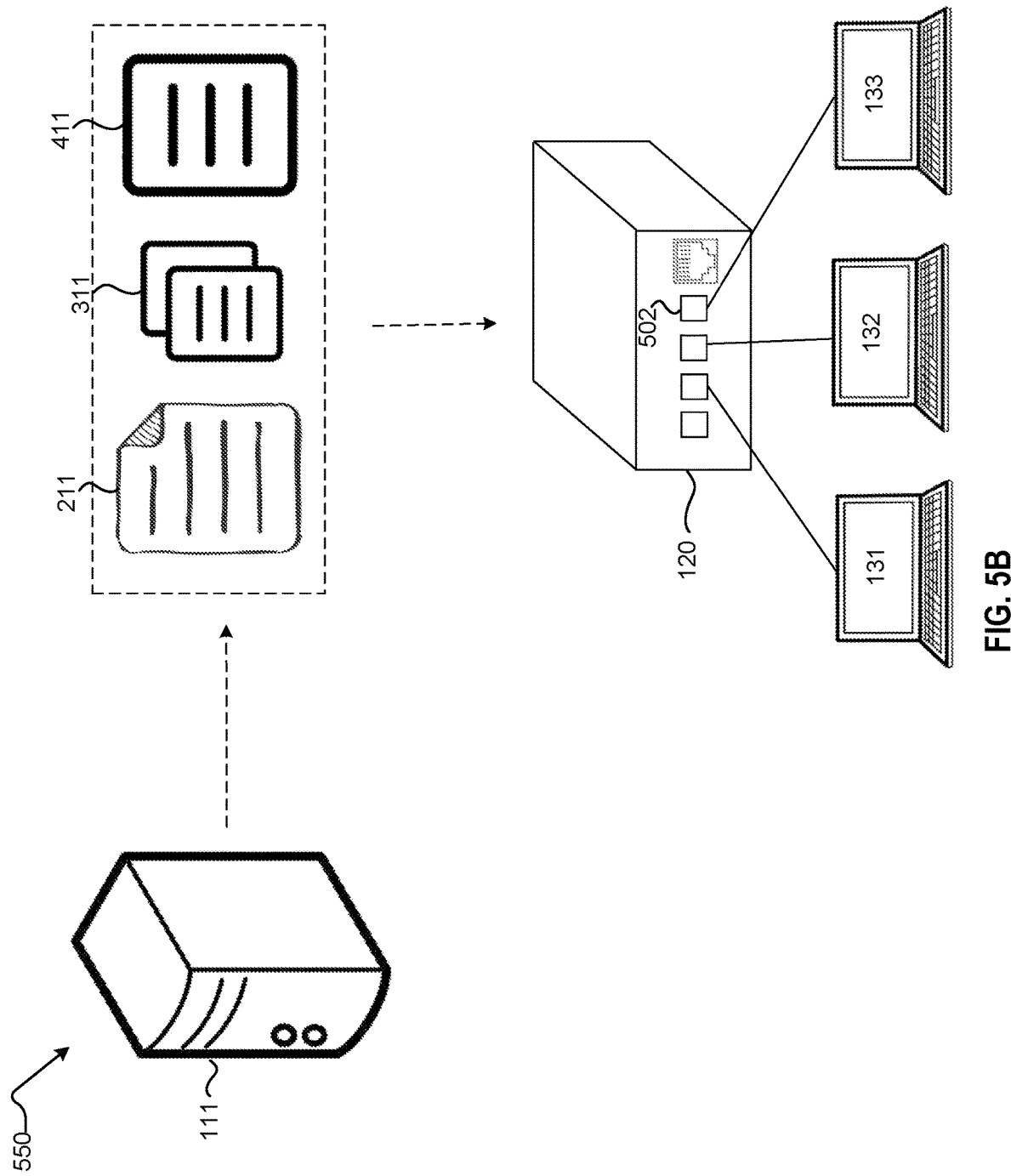
FIG. 5B is an exemplary illustration of an implementation of a configuration rollback using a commands validated by a grammar file, according to embodiments described in the present disclosure.

FIGS. 5A-5B illustrate exemplary implementations of using the generated grammar files to change and roll back configurations on a network device, such as the network device 120. For example, in FIG. 5A, a configuration 500 is shown, in which the computing component 111 may accept and validate commands to disable an interface 502, which may be connected to the client device 133. The computing component 111 may validate the commands using the grammar files 211, 311, and/or 411. Once the computing component 111 validates the commands, the computing component may implement the configuration 500 which disables the interface 502. However, such a configuration change is reversible, as defined by the grammar files 211, 311, and/or 411. Thus, in FIG. 5B, the computing component 111 may receive commands to roll back or revert the configuration 500 to a previous configuration shown as a configuration 550, in which the interface 502 is enabled. Each configuration change may be logged, for example, into the database 112. Therefore, the rules in the grammar files 211, 311, and/or 411 in the framework of the computing component 111 enable flexibility in changing and rolling back of different configurations of network devices.

Figure 6:
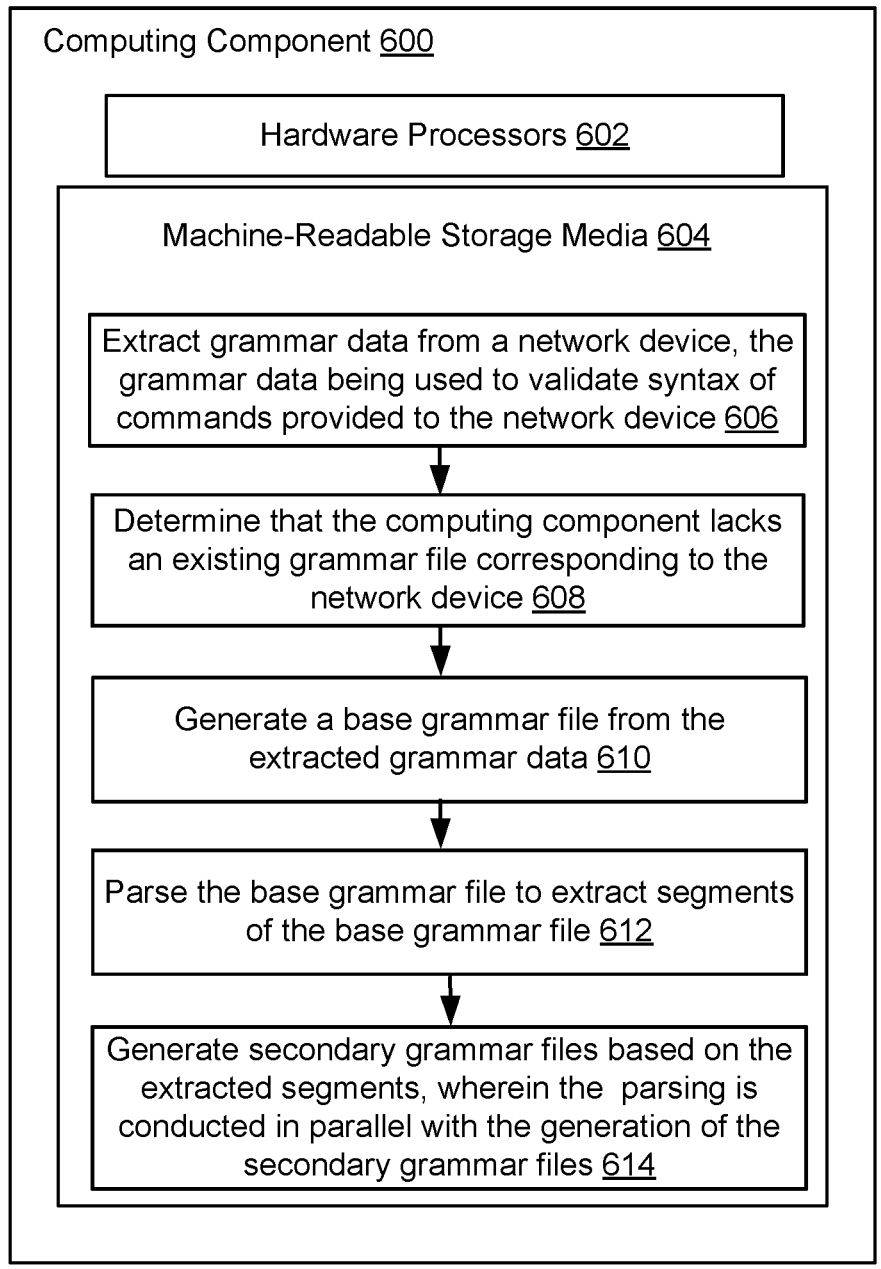
FIG. 6 is an exemplary flowchart, illustrating how a computing component such as a server generates a new grammar file including a base grammar file and secondary grammar files, according to embodiments described in the present disclosure.

FIG. 6 illustrates a computing component 600 that includes one or more hardware processors 602 and machine-readable storage media 604 storing a set of machine-readable/machine-executable instructions that, when executed, cause the hardware processor(s) 602 to perform an illustrative method of generating a grammar file corresponding to grammar data of a network device. It should be appreciated that there can be additional, fewer, or alternative steps performed in similar or alternative orders, or in parallel, within the scope of the various embodiments discussed herein unless otherwise stated. The computing component 600 may be implemented as the computing component 111 of FIGS. 1A, 1B, 2A, 3A, 4A, and 5A-5B. The computing component 600 may include a server. The machine-readable storage media 604 may be implemented as the machine-readable storage media 114 of FIG. 1B, and may include suitable machine-readable storage media described in FIG. 9.

At step 606, the hardware processor(s) 602 may execute machine-readable/machine-executable instructions stored in the machine-readable storage media 604 to extract grammar data from a network device, the grammar data being used to validate syntax of commands provided to the network device. Next, at step 608, the hardware processor(s) 602 may determine that the computing component 600 lacks an existing grammar file corresponding to the network device, for example, in a database such as the database 112 of the computing component 600. At step 610, the hardware processor(s) 602 may generate a new grammar file including a base grammar file and secondary grammar files based on the extracted grammar data. At step 612, the hardware processor(s) 602 may parse the base grammar file to extract segments of the base grammar file that may be relevant or pertinent to generation of secondary grammar files. At step 614, the hardware processor(s) 602 may generate secondary grammar files based on the extracted segments, wherein the parsing is conducted in parallel with the generation of the secondary grammar files.

Figure 7:
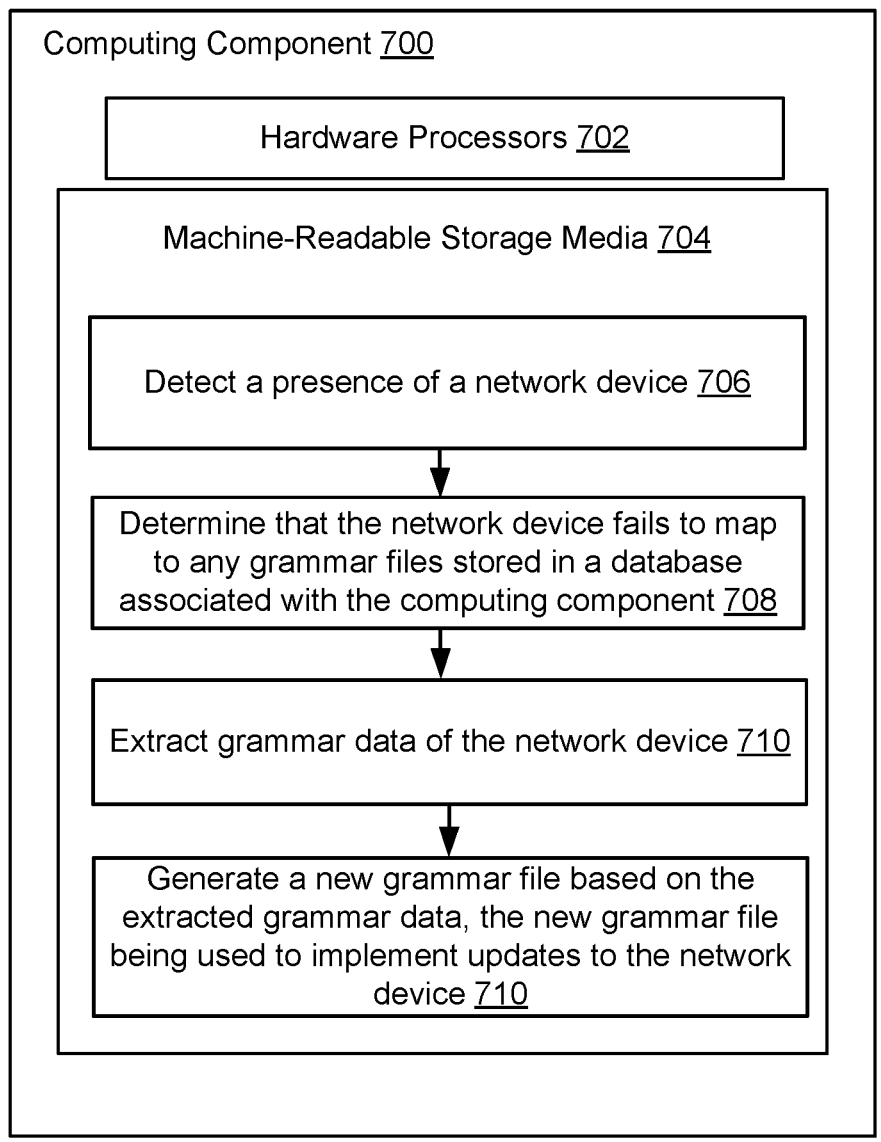
FIG. 7 is an exemplary flowchart, illustrating how a computing component such as a server generates a new grammar file if no existing grammar file in the computing component maps to a network device, according to embodiments described in the present disclosure.

FIG. 7 illustrates a computing component 700 that includes one or more hardware processors 702 and machine-readable storage media 704 storing a set of machine-readable/machine-executable instructions that, when executed, cause the hardware processor(s) 702 to perform an illustrative method of generating a grammar file corresponding to grammar data of a network device. It should be appreciated that there can be additional, fewer, or alternative steps performed in similar or alternative orders, or in parallel, within the scope of the various embodiments discussed herein unless otherwise stated. The computing component 700 may be implemented as the computing component 111 of FIGS. 1A, 1B, 2A, 3A, 4A, and 5A-5B. The computing component 700 may include a server. The machine-readable storage media 704 may be implemented as the machine-readable storage media 114 of FIG. 1B, and may include suitable machine-readable storage media described in FIG. 9.

At step 706, the hardware processor(s) 702 may detect a presence of a network device. Next, at step 708, the hardware processor(s) 702 may determine that the network device fails to map to any grammar files stored in a database, such as the database 112, of or associated with the computing component 700. At step 710, the hardware processor(s) 702 may extract grammar data of the network device. At step 712, the hardware processor(s) 702 may generate a new grammar file based on the extracted grammar data, the new grammar file being used to implement updates to the network device.

Figure 8:
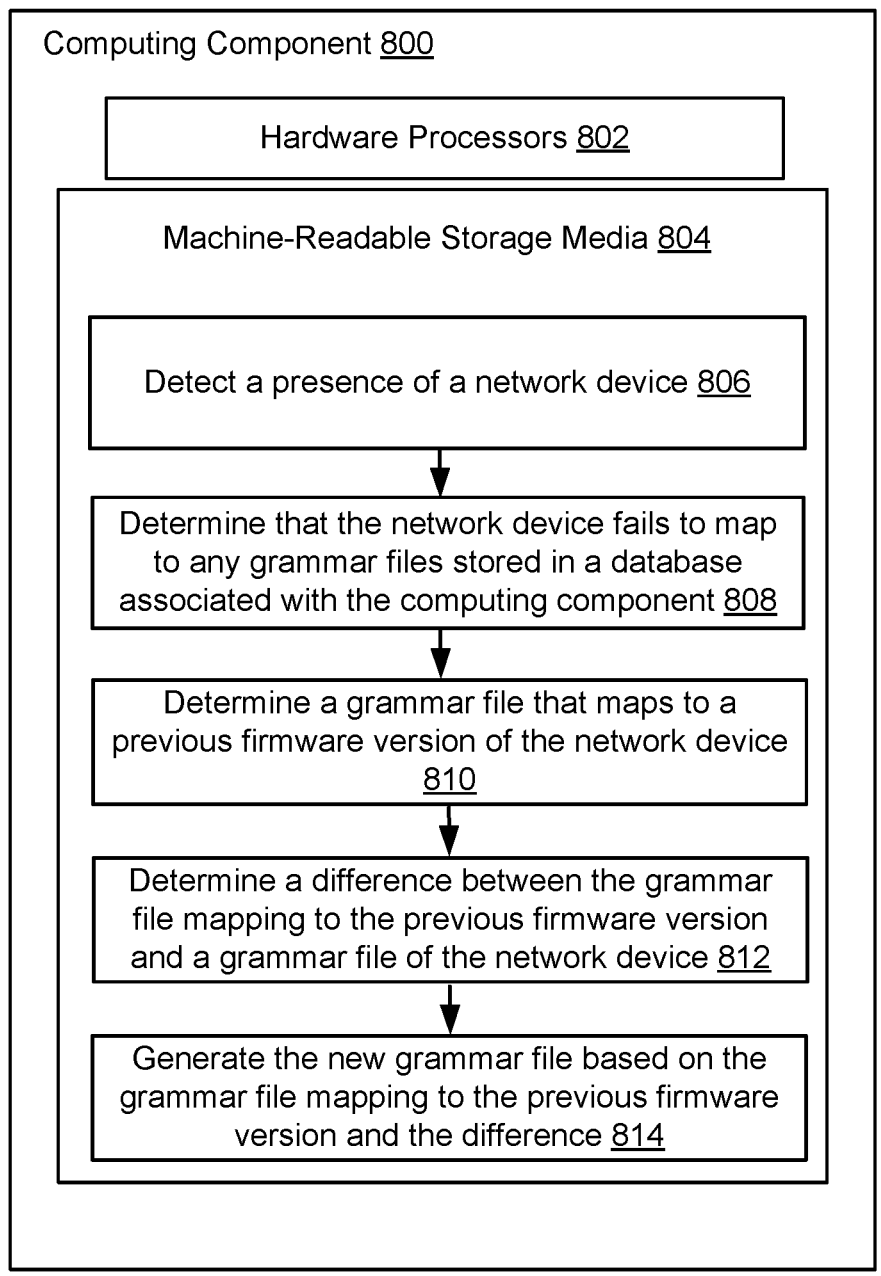
FIG. 8 is an exemplary flowchart, illustrating how a computing component such as a server generates a new grammar file if no existing grammar file in the computing component maps to a network device, according to embodiments described in the present disclosure.

FIG. 8 illustrates a computing component 800 that includes one or more hardware processors 802 and machine-readable storage media 804 storing a set of machine-readable/machine-executable instructions that, when executed, cause the hardware processor(s) 802 to perform an illustrative method of generating a grammar file corresponding to grammar data of a network device. It should be appreciated that there can be additional, fewer, or alternative steps performed in similar or alternative orders, or in parallel, within the scope of the various embodiments discussed herein unless otherwise stated. The computing component 800 may be implemented as the computing component 111 of FIGS. 1A, 1B, 2A, 3A, 4A, and 5A-5B. The computing component 800 may include a server. The machine-readable storage media 804 may be implemented as the machine-readable storage media 114 of FIG. 1B, and may include suitable machine-readable storage media described in FIG. 9.

At step 806, the hardware processor(s) 802 may execute machine-readable/machine-executable instructions stored in the machine-readable storage media 804 to detect a presence of a network device. Next, at step 808, the hardware processor(s) 802 may determine that the network device fails to map to any grammar files stored in a database associated with the computing component. At step 810, the hardware processor(s) 802 may determine a grammar file that maps to a previous firmware version of the network device. At step 812, the hardware processor(s) 802 may determine a difference between the grammar file mapping to the previous firmware version and a grammar file of the network device. At step 814, the hardware processor(s) 802 may generate the new grammar file based on the grammar file mapping to the previous firmware version and the difference.

Figure 9:
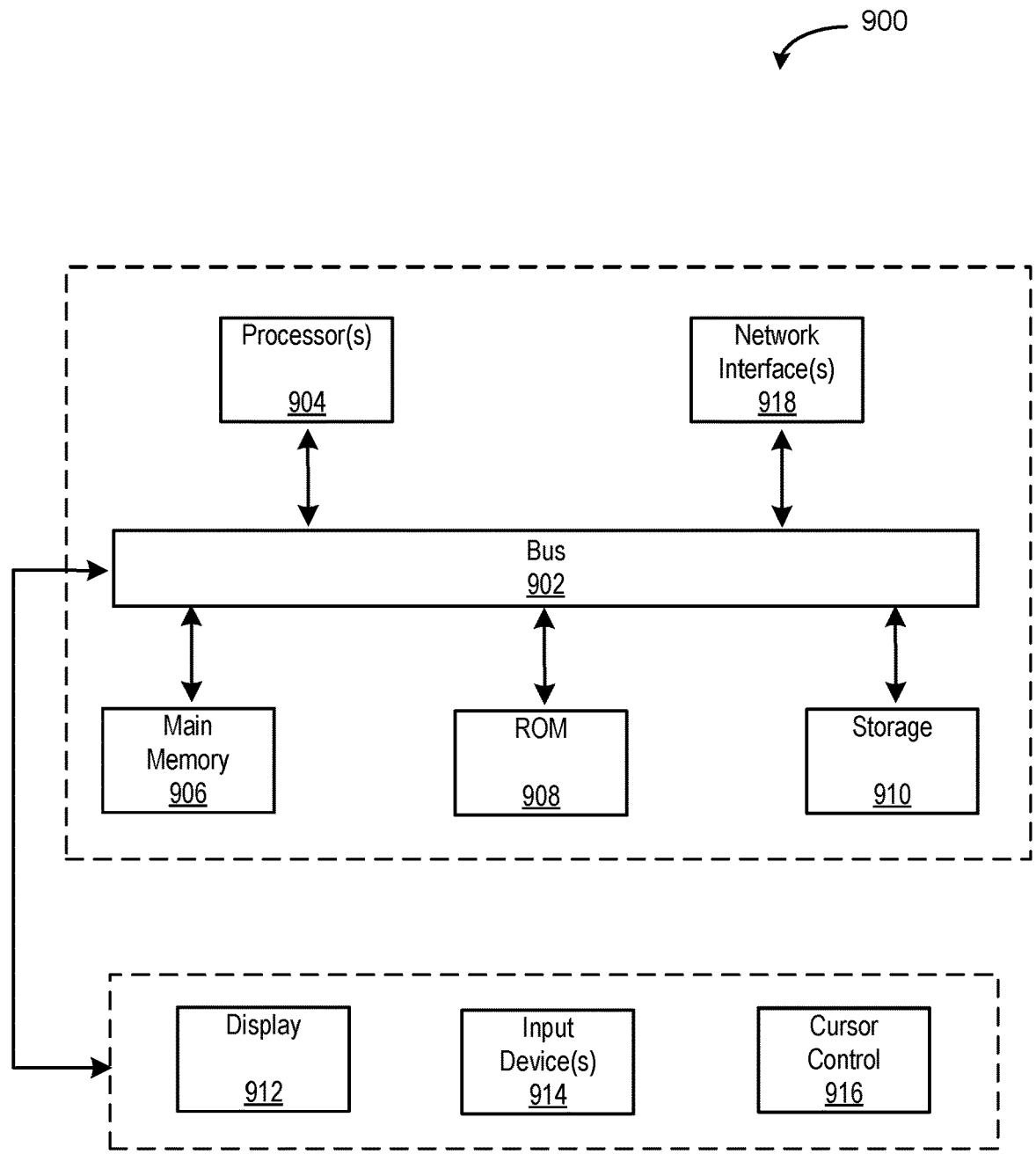
FIG. 9 is an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "engine," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of a server comprising:
    extracting grammar data from a network device, the grammar data being used to validate syntax of commands provided to the network device;
    determining that the server lacks an existing grammar file corresponding to the network device, wherein the network device fails to map to any grammar files stored in the server;
    generating a base grammar file from the extracted grammar data;
    parsing the base grammar file to extract segments of the base grammar file; and
    generating secondary grammar files based on the extracted segments, wherein the parsing is conducted in parallel with the generation of the secondary grammar files.

2. The computer-implemented method of claim 1, wherein the secondary grammar files comprise a mask and a patch, the mask including a condensed version of the base grammar file and the patch including instructions regarding how one or more commands appear in a running configuration.

3. The computer-implemented method of claim 2, wherein the mask is generated by extracting, from the network device, ordering data of CLI (command-line interface) commands and rules of dependencies between the CLI commands.

4. The computer-implemented method of claim 2, wherein the mask includes rules to sort commands.

5. The computer-implemented method of claim 2, wherein the base grammar file is generated at the server in a JSON (JavaScript Object Notation) format.

6. The computer-implemented method of claim 1, further comprising:
    rolling back the network device to a previous configuration to enable an interface that was disabled from the previous configuration.

7. The computer-implemented method of claim 1, wherein the extraction of grammar data is via a REST (Representational State Transfer) API (Application Programming Interface).

8. The computer-implemented method of claim 1, wherein the extraction of grammar data is in response to a firmware update at the network device.

9. A computing system comprising:
    a server that implements updates to a network device;
    one or more processors; and
    a memory storing instructions that, when executed by the one or more processors, cause the one or more processors to:
    detect a presence of the network device;
    determine that the network device fails to map to any grammar files stored in the server;
    extract grammar data of the network device; and
    generate a new grammar file based on the extracted grammar data, the new grammar file being used to implement updates to the network device.

10. The computing system of claim 9, wherein the instructions further cause the one or more processors to:
    in response to a determination that the network device fails to map to any grammar files, determine a grammar file that maps to a previous firmware version of the device; wherein
    the generation of the new grammar file comprises:
    determining a difference between the grammar file mapping to the previous firmware version and a grammar file of the network device; and
    generating the new grammar file based on the grammar file mapping to the previous firmware version and the difference.

11. The computing system of claim 9, wherein the generation of the new grammar file comprises:
    generating a base grammar file and secondary grammar files.

12. The computing system of claim 9, wherein the secondary grammar files comprise a mask and a patch, the mask including a condensed version of the base grammar file and the patch including instructions regarding how one or more commands appear in a running configuration.

13. The computing system of claim 12, wherein the mask is generated by extracting, from the network device, ordering data of CLI (command-line interface) commands and rules of dependencies between the CLI commands.

14. The computing system of claim 12, wherein the mask includes rules to sort commands.

15. The computing system of claim 12, wherein the base grammar file is generated at the server in a JSON (JavaScript Object Notation) format.

16. The computing system of claim 9, wherein the instructions further cause the one or more processors to roll back the network device to a previous configuration to enable an interface that was disabled from the previous configuration.

17. A non-transitory computer-readable storage medium including instructions that, when executed by at least one processor of a computing system, cause the computing system to perform a method comprising:
    extracting grammar data from a network device, the grammar data being used to validate syntax of commands provided to the network device;

determining that the server lacks an existing grammar file corresponding to the network device, wherein the network device fails to map to any grammar files stored in the server;

generating a base grammar file from the extracted grammar data;

parsing the base grammar file to extract segments of the base grammar file; and generating secondary grammar files based on the extracted segments, wherein the parsing is conducted in parallel with the generation of the secondary grammar files.

18. The non-transitory computer-readable storage medium of claim 17, wherein the secondary grammar files comprise a mask and a patch, the mask including a condensed version of the base grammar file and the patch including instructions regarding how one or more commands appear in a running configuration.

19. The non-transitory computer-readable storage medium of claim 18, wherein the mask is generated by extracting, from the network device, ordering data of CLI (command-line interface) commands and rules of dependencies between the CLI commands.

20. The non-transitory computer-readable storage medium of claim 18, wherein the mask includes rules to sort commands.

* * * * *